Feb. 5, 1924.

J. BERGNER

FLOAT CONTROLLED VALVE

Filed Aug. 24, 1921

1,482,505

Patented Feb. 5, 1924.

1,482,505

UNITED STATES PATENT OFFICE.

JEAN BERGNER, OF DUSSELDORF, GERMANY.

FLOAT-CONTROLLED VALVE.

Application filed August 24, 1921. Serial No. 494,956.

*To all whom it may concern:*

Be it known that I, JEAN BERGNER, a citizen of the German Republic, residing at Dusseldorf, Rhenish Prussia, Germany, have invented certain new and useful Improvements in and Relating to Float-Controlled Valves, of which the following is a specification.

The invention relates to an inlet valve controlled by a float for use in water closet cisterns, or similar tanks, and consists chiefly in the provision of a lever mechanism with a float at one end and an adjustable circular plug at the other end for closing the inlet nozzle, and a circular splash trap with an opening at the bottom and side.

The advantage of the new valve is in its great simplicity and reliability, and as it is easily accessible the fit of the plug against the valve seat can be tested while at work, and the valve seat can be ground without dismantling the valve.

The accompanying drawing shows a valve construction according to the invention by way of example.

Figure 1:
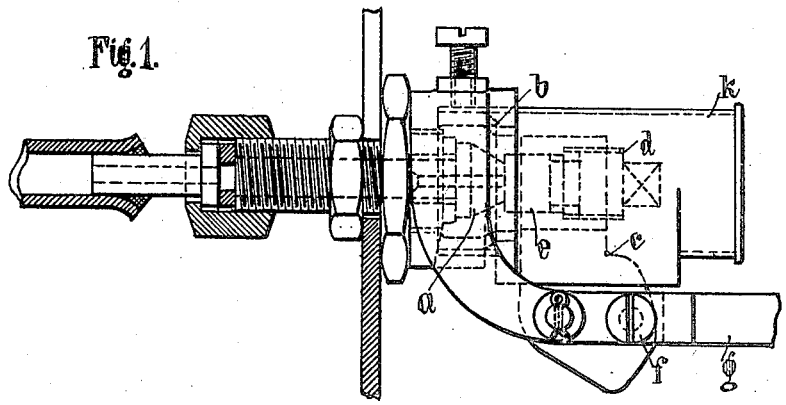
Figure 1 is a side elevation.
Figure 2:
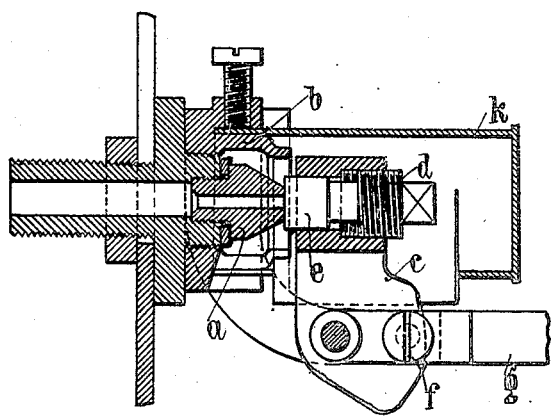
Figure 2 is a sectional elevation.

A centrally bored conically shaped valve seat $a$ is screwed tightly to the inlet socket of the cistern and is enclosed by a circular splash trap $b$ with an opening at the bottom and side. The splash trap has two arms serving to carry the axis pin for the lever mechanism. The lever mechanism consists of a forked rod or lever $g$ which carries the float (not shown in the drawings) and a flat piece of metal or lever $c$ adjustable in position relative to the float lever by means of the fixing screw $f$. The short lever $c$ carries a circular plug or stopper $e$ secured to it. This plug may be made of rubber and its position is regulated by the screw $d$ so that it will fit tightly upon the valve seat. The valve is covered by a protecting cap which is pressed into a groove formed round the splash trap and is kept in place by a screw at the top.

When the cistern is empty the float carries the lever $g$ downwards and the rubber plug $e$ is removed from the conical valve seat. The water then flows through the inlet nozzle and the hole in the cone, and fills the cistern. The float rises with the inflowing water until the highest position is reached, when the lever presses the plug $e$ against the valve seat and stops the flow of water. By varying the relative position of the levers $c$ and $g$ the level of the water in the tank can be altered—that is, the quantity of water required for flushing can be regulated.

The fit of the plug against the valve seat can be easily adjusted as on the removal of the protecting cover $k$ the plug $e$ and conical valve seat $a$ are accessible.

The regulation of the valve by turning the screw $d$ can be carried out whilst it is under water pressure, as the splash caused by a loose plug is caught by the splash trap and carried down to the opening at the bottom. Further the valve seat can be ground without dismantling the valve parts, or the cone $a$ could be removed and replaced. The latter of course could only be carried out after turning off the cock outside the cistern.

Great simplicity and reliability are obtained by mounting of the plug directly upon the lever.

The disadvantage of the well known construction with a totally enclosed valve and a plug fixed to a slide, consisting in the binding of the slide, on account of oxidation, is avoided.

By making both the conical valve seat $a$ and the screw $d$ from non-metallic substances such as porcelain, glass or the like, the binding of these parts through oxidation can be prevented.

Having now particularly described and ascertained the nature of my said invention and in what manner the same is to be performed, I declare that what I claim is:

1. A float-controlled inlet valve comprising a body having a valve seat, a plug adapted to be applied against said valve seat so as to closely block the passage for the liquid, a float and a lever carrying same, said lever being hingedly connected to said body, a plug carrying lever and means for coupling said float lever with said plug carrying lever.

2. A float-controlled inlet valve comprising a body having a valve seat, a plug adapted to be applied against said valve seat so as to closely block the passage for the liquid, a float and a lever carrying same, said lever being hingedly connected to said body, a plug carrying lever also hinged to said body and means for coupling said float lever with said plug carrying lever.

3. A float-controlled inlet valve comprising a body having a valve seat, a plug adapted to be applied against said valve seat so as to closely block the passage for the liquid, a float and a lever carrying same, said lever being hingedly connected to said body, a plug carrying lever and means for coupling said plug carrying lever with said float lever in different angular positions.

4. A float-controlled inlet valve comprising a body having a valve-seat, a plug adapted to be applied against said valve seat so as to closely block the passage for the liquid, a float and a lever carrying same, said lever being hingedly connected to said body, a plug carrying lever and a set screw in said float lever for fixing said plug carrying lever to said float lever in different positions.

5. A float-controlled inlet valve comprising a body having a valve-seat, a plug adapted to be applied against said valve seat so as to closely block the passage for the liquid, a float and a lever carrying same, said lever being hingedly connected to said body, a plug carrying lever, means for varying the position of said plug relatively to said lever and means for coupling said plug carrying lever with said float lever in different positions.

6. A float-controlled inlet valve comprising a body having a valve seat, a plug adapted to be applied against said valve seat so as to closely block the passage for the liquid, a float and a lever carrying same, said lever being hingedly connected to said body, a plug carrying lever, means for coupling said float lever and said plug carrying lever and a splash trap open laterally and towards the bottom.

In testimony whereof, I have signed my name to this specification in the presence of two subscribing witnesses.

JEAN BERGNER.

Witnesses:
WALTER SCHULZE,
ELSE HATTIG.